(12) United States Patent
Aslanyan et al.

(10) Patent No.: US 12,323,638 B2
(45) Date of Patent: *Jun. 3, 2025

(54) METHODS AND APPARATUS FOR DYNAMIC VIDEO STREAMING COMPOSITION

(71) Applicant: Movella Inc., Henderson, NV (US)

(72) Inventors: Andranik Aslanyan, Henderson, NV (US); Vin Lee Rah, Henderson, NV (US); Jasmine Hunter, Henderson, NV (US)

(73) Assignee: Movella Inc., Henderson, NV (US)

( * ) Notice: Subject to any disclaimer, the term of this patent is extended or adjusted under 35 U.S.C. 154(b) by 82 days.

This patent is subject to a terminal disclaimer.

(21) Appl. No.: 18/176,950

(22) Filed: Mar. 1, 2023

(65) Prior Publication Data

US 2024/0298048 A1 Sep. 5, 2024

(51) Int. Cl.
| | |
|---|---|
| *H04N 21/234* | (2011.01) |
| *H04N 5/265* | (2006.01) |
| *H04N 21/258* | (2011.01) |
| *H04N 21/2743* | (2011.01) |
| *H04N 21/485* | (2011.01) |

(52) U.S. Cl.
CPC ....... *H04N 21/23424* (2013.01); *H04N 5/265* (2013.01); *H04N 21/25891* (2013.01); *H04N 21/2743* (2013.01); *H04N 21/4854* (2013.01)

(58) Field of Classification Search
CPC ............. H04N 21/23424; H04N 5/265; H04N 21/25891; H04N 21/2743; H04N 21/4854
See application file for complete search history.

(56) References Cited

U.S. PATENT DOCUMENTS

| | | | |
|---|---|---|---|
| 2006/0010476 A1* | 1/2006 | Kelly ................ | H04N 7/17318 348/E7.071 |
| 2014/0025650 A1* | 1/2014 | Lee ....................... | G06F 40/103 707/694 |
| 2016/0147713 A1* | 5/2016 | Ni ............................. | G06T 3/40 345/660 |
| 2016/0366464 A1* | 12/2016 | Rouady ............. | H04N 21/4312 |

(Continued)

OTHER PUBLICATIONS

International Search Report and Written Opinion for related matter PCT/US2024/010876 mailed May 9, 2024.

*Primary Examiner* — Kyu Chae
(74) *Attorney, Agent, or Firm* — Ogawa P.C.

(57) ABSTRACT

A method includes capturing, in a streamer device, a video stream from a user comprising a plurality of images, receiving, in the streamer device from the user, a specification of an image location associated with the plurality of images, receiving, in the streamer device from a remote provider server, incoming image data, combining, in the streamer device, the video stream and the incoming image data, to form a composite user video stream, wherein the incoming image data is disposed in the image location within the plurality of images, sending, from the streamer device to a video distribution server, the composite video stream, receiving, in the streamer device from the video distribution server, video consumption data associated with the composite video stream provided by the video distribution server and sending, from the streamer device to the remote provider server, the video consumption data associated with the composite video.

20 Claims, 5 Drawing Sheets

(56) References Cited

U.S. PATENT DOCUMENTS

| | | |
|---|---|---|
| 2017/0250881 A1* | 8/2017 | Kellicker ............ H04L 65/1083 |
| 2018/0310031 A1* | 10/2018 | Sarkar .................... H04H 60/45 |
| 2019/0356944 A1 | 11/2019 | Patel et al. |
| 2020/0108316 A1* | 4/2020 | Nay ................. H04N 21/23424 |
| 2020/0226642 A1 | 7/2020 | Turner et al. |
| 2021/0316223 A1 | 10/2021 | Nay |
| 2021/0326937 A1 | 10/2021 | Cselle et al. |
| 2023/0048162 A1 | 2/2023 | Brown et al. |

\* cited by examiner

METHODS AND APPARATUS FOR DYNAMIC VIDEO STREAMING COMPOSITION

BACKGROUND

The present invention relates to streaming media. More specifically, embodiments of the present invention relate to production of streaming media.

Individual users streaming video of themselves playing games, watching videos, chatting and the like is a phenomena that did not exist in the pre-internet world. Today, it is estimated that companies such as Twitch, YouTube, Steam, Facebook and the like rebroadcast over 30 billion hours of users' streaming video to viewers per year.

To monetize their service, such companies introduce advertisements into the rebroadcast streams. These advertisements include pre-roll ads before the companies begin rebroadcasting the users' streams, advertisements interrupting the users' streams, banner ads on top of the users' streams, and the like.

One problem with these companies' behaviors is loss of control by the streamer. In particular, users' often have little if any say over how the companies interrupt their streams. For example, the streamer may be discussing something sensitive with their viewers, and the companies may arbitrarily interrupt the stream to play an ad. The streamer may not even be aware that the rebroadcaster has broken away for an ad. As another example, companies may run ads on the user's stream that the streamer disagrees with. Again, the streamer may not even be aware of it. As still another example, the companies may place their own images on top of the users' stream that obscures an important part of the stream, such as a face or another screen.

Another problem is viewer loss. If viewers click upon the advertisement provided by the rebroadcaster, the viewers are transported away from the streamer's stream. In other words, the streaming services provided by the broadcasters are highly disadvantageous to the streamer as they may constantly lose viewership. This problem is especially harmful to streamers as their value is often tied to the number of viewers.

In light of the above, solutions are necessary and rooted in computer technology to overcome the specific problems described above in computer networks. with reduced drawbacks.

SUMMARY

The present invention relates to streaming media. More specifically, embodiments of the present invention relate to production of streaming media.

Embodiments of the present invention address the problem of streamers of other content providers retaining viewers of their streaming channels. If adhering to the routine, conventional functioning of Internet linking protocol, viewers who click upon the ads placed by rebroadcasts are instantly transported away or redirected from the streamers' channels. In contrast, in some embodiments, viewer clicks upon advertisements provided by the streamer may be associated with the streamer. Additionally, embodiments provide streamers with the ability to control the appearance of advertisements (or other video streams or images) on their video stream dynamically, and the ability to control the types of advertising that will appear on their video stream.

According to one aspect, a method is disclosed. One method includes capturing, in a streamer device, a user video stream from a user comprising a plurality of images, and receiving, in the streamer device from the user, a specification of an incoming image location characteristic associated with the plurality of images, wherein the incoming image characteristic is selected from a first group consisting of: an incoming image location within the plurality of images, and an incoming image size within the plurality of images. A technique may include receiving, in the streamer device from a remote provider server, incoming image data, combining, in the streamer device, the user video stream and the incoming image data, to form a composite user video stream, wherein the an incoming image data is disposed in the image location within the plurality of images in response to the incoming image data and the incoming image characteristic, and sending, from the streamer device to a video distribution server, the composite user video stream. A process may include receiving, in the streamer device from the video distribution server, video consumption data associated with the composite user video stream provided by the video distribution server, and sending, from the streamer device to the remote provider server, the video consumption data associated with the composite user video.

According to another aspect, a non-transitory computer-readable storage medium storing one or more programs configured to be executed by one or more processors of an electronic device, the one or more programs including instructions is described. One set of instructions may include determining a video stream from a user comprising a plurality of images including a first image, and determining a specification of an incoming image characteristic, wherein the incoming image characteristic is selected from a first group consisting of: an image position from a plurality of image positions and an image size from a plurality of image sizes. Another set of instructions may include receiving, from a remote provider server, incoming image data, forming a composite user video stream in response to the video stream, the incoming image characteristic, and the incoming image data, and outputting, to a video distribution server, the composite user video stream. A set of instructions may include receiving, from the video distribution server, video consumption data associated with the video distribution server providing output of the composite user video stream, and outputting, to the remote provider server, the video consumption data associated with the composite user video.

According to another aspect, an apparatus is described. One device may include a video input portion, configured to provide a user video stream from a user comprising a plurality of images. An apparatus may include a processor coupled to the video input portion, wherein the processor is configured to receive, from the user, a specification of an incoming image location characteristic associated with the plurality of images, wherein the incoming image characteristic is selected from a first group consisting of: an incoming image location within the plurality of images, and an incoming image size within the plurality of images, wherein the processor is configured to receive, from a remote provider server, incoming image data, wherein the processor is configured to combine the user video stream and the incoming image data, to form a composite user video stream, wherein the an incoming image data is disposed in the image location within the plurality of images in response to the incoming image data and the incoming image characteristic, wherein the processor is configured to output, to a video distribution server, the composite user video stream, wherein the processor is configured to receive, from the video distribution server, video consumption data associated with the composite user video stream provided by the video distribution server, and wherein the processor is configured to output, to the remote provider server, the video consumption data associated with the composite user video.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

Figure 1:
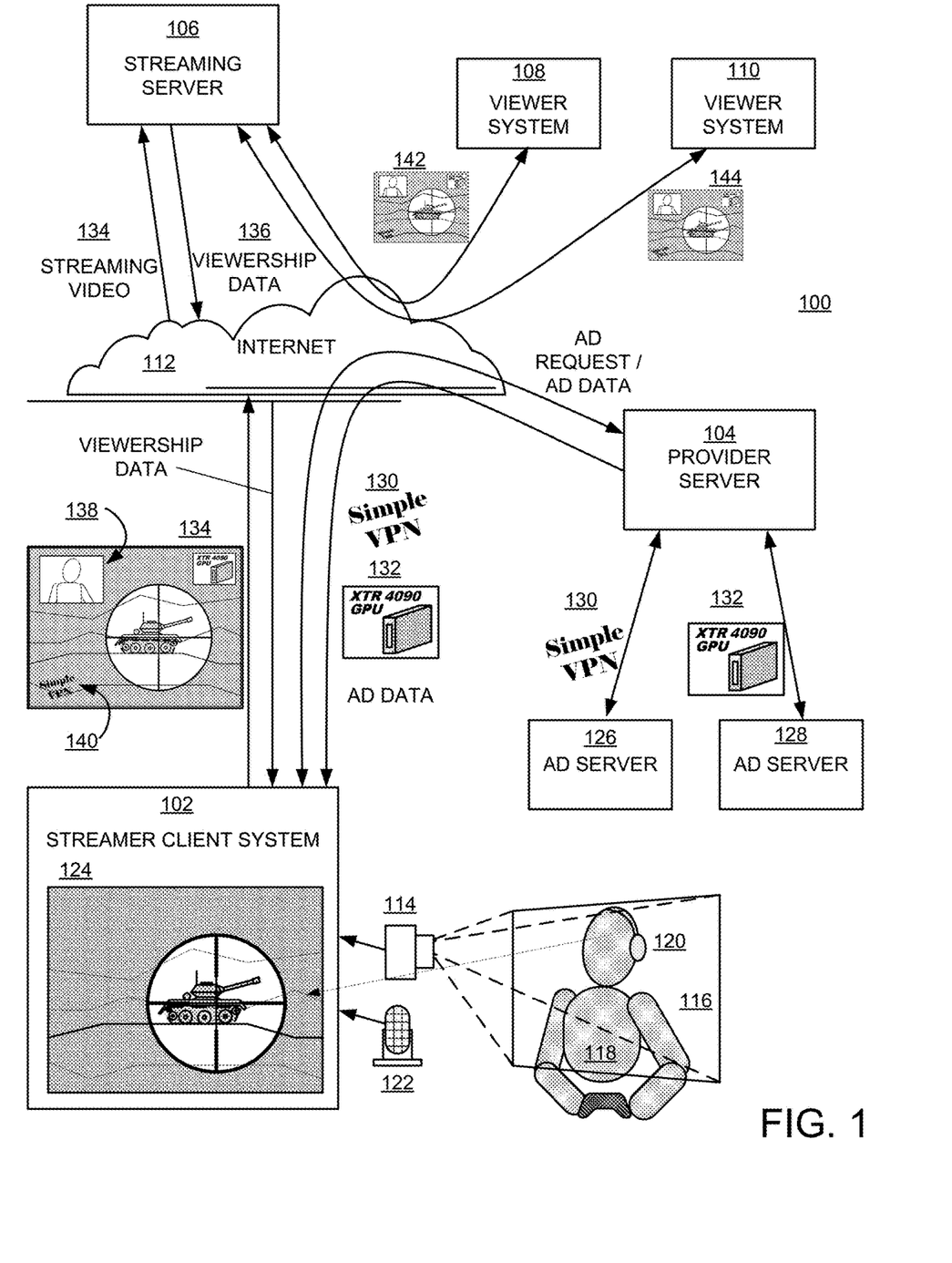
FIG. 1 illustrates a functional block diagram of some embodiments of the present invention.

FIG. 1 illustrates an overview of a system including various embodiments of the present invention. More specifically, system 100 includes a streamer client system 102, a provider server 104, a rebroadcaster or streaming server 106, a number of consumers 108 and 110, and a wide-area computer network, e.g. Internet 112.

Provider server 104 may be coupled to one or more advertiser servers, e.g. 126 and 128, also via computer network 112. In various embodiments, advertiser servers e.g. 126 and 128 may provide one or more advertisements, informational data, or the like e.g. 130 and 132 to client system 102 via provider server 104, as illustrated. In other embodiments, advertiser servers, e.g. 126 and 128 may provide data 130 and 132 to client system 102, bypassing provider server 104.

In this example, streamer client system 102 is typically coupled to a video camera 114, that takes video images 116 of a user/streamer 118. Additionally, client system 102 is also typically coupled to headphones 120 enabling streamer 118 to hear music, voice chat, etc. and a microphone 122 enabling streamer 118 to make audio comments, or the like. In various embodiments, streamer client system 102 may include one or more programs, e.g. games, music or graphic programs, etc., that user 118 plays with or interacts with. In response, client system 102 may generate images, such as image 124 as visual feedback to streamer 118. These images may be output to the user via a display (e.g. monitor, VR headset, etc.) coupled to client system 102. A can be seen, client system 102 can output streaming video 134, which may be user-configurable composite video images, as will be discussed further, below.

As illustrated in FIG. 1, streaming video data 134 from client system 102 is typically streamed to streaming server 106 via the wide-area network 112. Streaming server 106 may then rebroadcast or stream the streaming video data 134 to multiple consumers, e.g. 108 and 110. In some embodiments, these consumer devices may be smart devices, tablets, watches, laptop computers, televisions, projection devices, or the like.

As will be discussed below, streaming server 106 may monitor the number of viewers, the amount of viewership time, and the like of the rebroadcast video stream, e.g. 134. These data, termed viewership data 136 may be provided back to client system 102 and or provider server 104.

Figure 2:
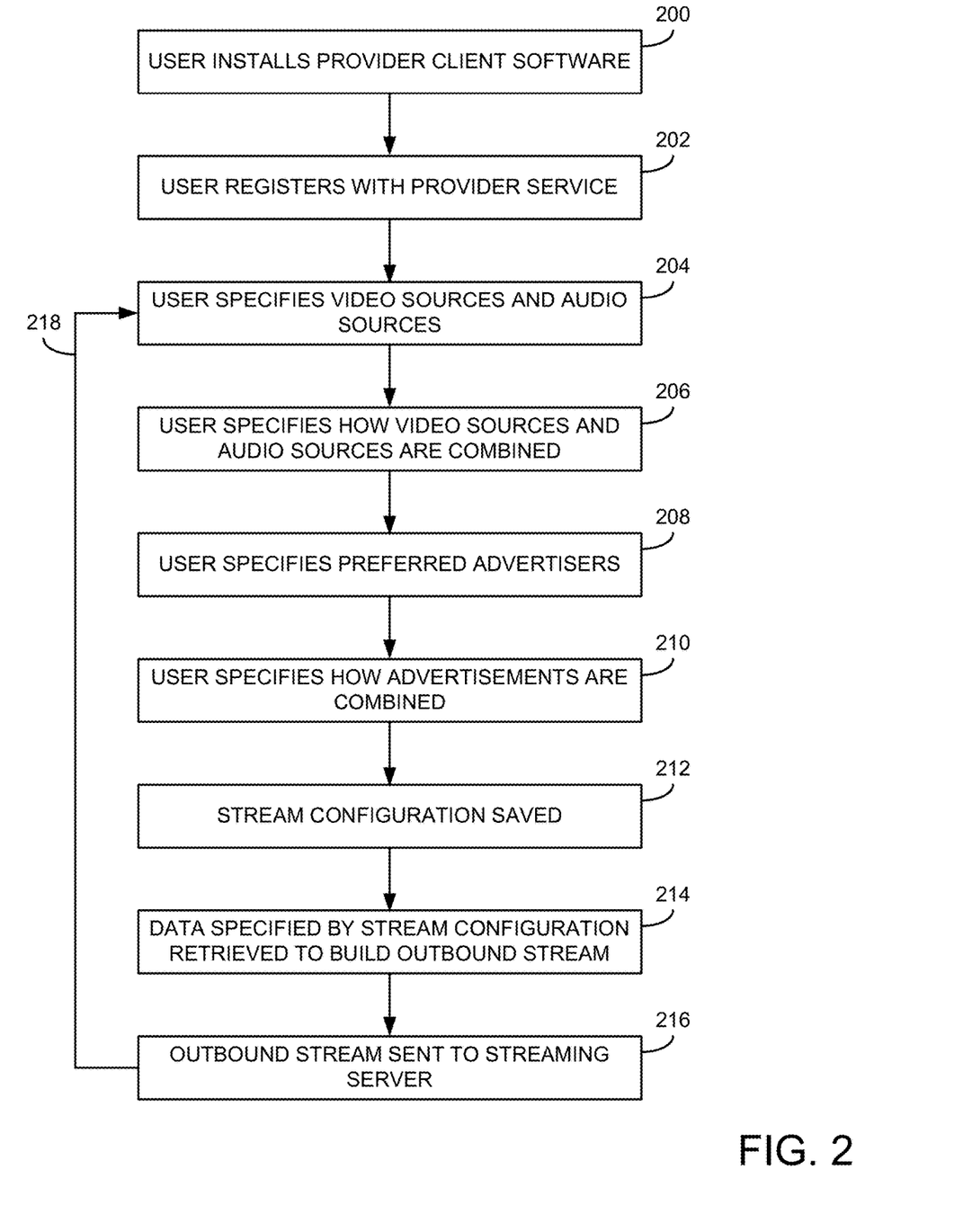
FIG. 2 illustrates a process diagram according to various embodiments of the present invention; an FIGS. 3A-B illustrates another process diagram according to various embodiments of the present invention.

FIG. 2 illustrates a flow diagram according to some embodiments of the present invention. More specifically, FIG. 2 illustrates a process of a user dynamically specifying content of their output video stream. For sake of convenience, the process in FIG. 2 will reference elements illustrated in FIG. 1, although FIG. 2 may be applied to other configurations.

Initially, user 118 may download and install client software associated with provider server 104 on client system 124, step 200. In some cases, user 118 then creates an account with provider server 104, step 202. Embodiments of the client software are expected to be provided by Obskur, the assignee of the present patent application.

In various embodiments, the client software may include a graphical user interface (GUI) allowing user 118 to specify the stream mixing functionality described below. One functionality allows user 118 to specify sources of video data and or audio data to combine, step 204. In some examples, video sources may include one or more windows, e.g. a game-play window 124; one or more external video sources, e.g. video camera 114; a video; and the like; audio sources may include music, e.g. Spotify; a microphone 122; and the like.

User 118 may also specify how the video data and the audio data are combined, step 206. In some examples, one video source may be assigned the primary screen, and another source may appear overlaid upon a portion of the primary screen, and the like. In various embodiments, the size, shape, orientation of the overlaid window can be specified by user 118 An example of this is illustrated in streaming video 134 in FIG. 1, where video camera video 116 is shown superimposed 138 upon the game play video, image 124 in rebroadcast video stream 134. Advantages to allowing the user to specify the location and size of overlay windows includes that user 118 may specifically avoid having important data obscured in the primary window. For example if game play video image 124 displayed a health bar, or the like, in the upper left corner, user 118 could place video images 116 on the bottom left corner, or the like so the health bar would not be obscured.

In various embodiments, another functionality provided allows user 118 to select one or more advertising sources (e.g. preferred advertisers) or advertising preferences (without specifically naming advertisers), step 208. In some examples, user 118 may specify advertisers that desire to pay the most money; advertisers by name, e.g. ones they have a sponsorship agreement (e.g. Redbull, Sony); and the like. In some cases, user 118 may specify advertisement preferences (e.g. food, consumer electronic, etc.), and allow provider server 104 to automatically select advertisers based upon such preferences. Additionally, in some examples, users 118 may also specify advertisers they do not want to receive advertisements from. In some examples, a user may not want advertisements from oil companies, or the like. In some embodiments, user 118 may also specify how the advertisements are incorporated to an output video stream, step 210. In some examples, a gameplay window may be assigned the primary screen, and an advertisement may be overlaid upon a portion of the primary screen, and the like. In various embodiments, the size, shape, orientation of the overlaid advertisement can be specified by user 118. It is contemplated that advertisements may be in many different forms including static images such as logos, sounds or musical jingles, videos, mini games, and the like. An example of this is illustrated in streaming video 134 in FIG. 1, where an advertisement logo 130 is shown superimposed 140 upon the game play video, in video stream 134. As mentioned above, advantages to allowing the user to specify the location and size of advertisements includes that user 118 may specifically avoid having important data obscured in the primary window.

In some embodiments, the advertisements may include links to the advertiser's website, or the like. In some cases, if a viewer of the stream clicks upon the advertisement, the website or the linked page may open in the same spot as where the advertisement is placed. In other words, a viewer will not be transported away from the streamer's stream, and the advertiser's website or linked page will appear in the provided advertiser's window. It is believed that such embodiments greatly increase the viewership and viewership retention of users' video streams. In some embodiments, the ordering of steps 204-210 may be changed. For example, after step 202, step 208 may be performed before step 204, or the like.

Once user 118 finishes specifying the content of their stream, user 118 can save the configuration, step 212. Subsequently, when user 118 live streams, the saved stream configuration file is used by streamer client system 102 to receive the desired video sources, receive advertisements, and the like to form the user stream (e.g. 134), step 214, which is then output to the rebroadcaster, step 216. In various embodiments, user 118 can reconfigure the outbound stream on the fly, by adding or deleting sources, reconfiguring the display of sources, adding or deleting advertisers, and the like, step 218. As illustrated, step 218 can be looped back to any of steps 204-210, which may be in any order, as discussed above.

In some embodiments, the configuration for video stream 134 (i.e. which advertisers appear, etc.) are maintained for reporting and accounting purposes. In some cases the real-estate area percentages for advertisements on video stream 134 may also be maintained (e.g. 10% coverage, 25% coverage of video stream 134, etc.).

Figure 3A:
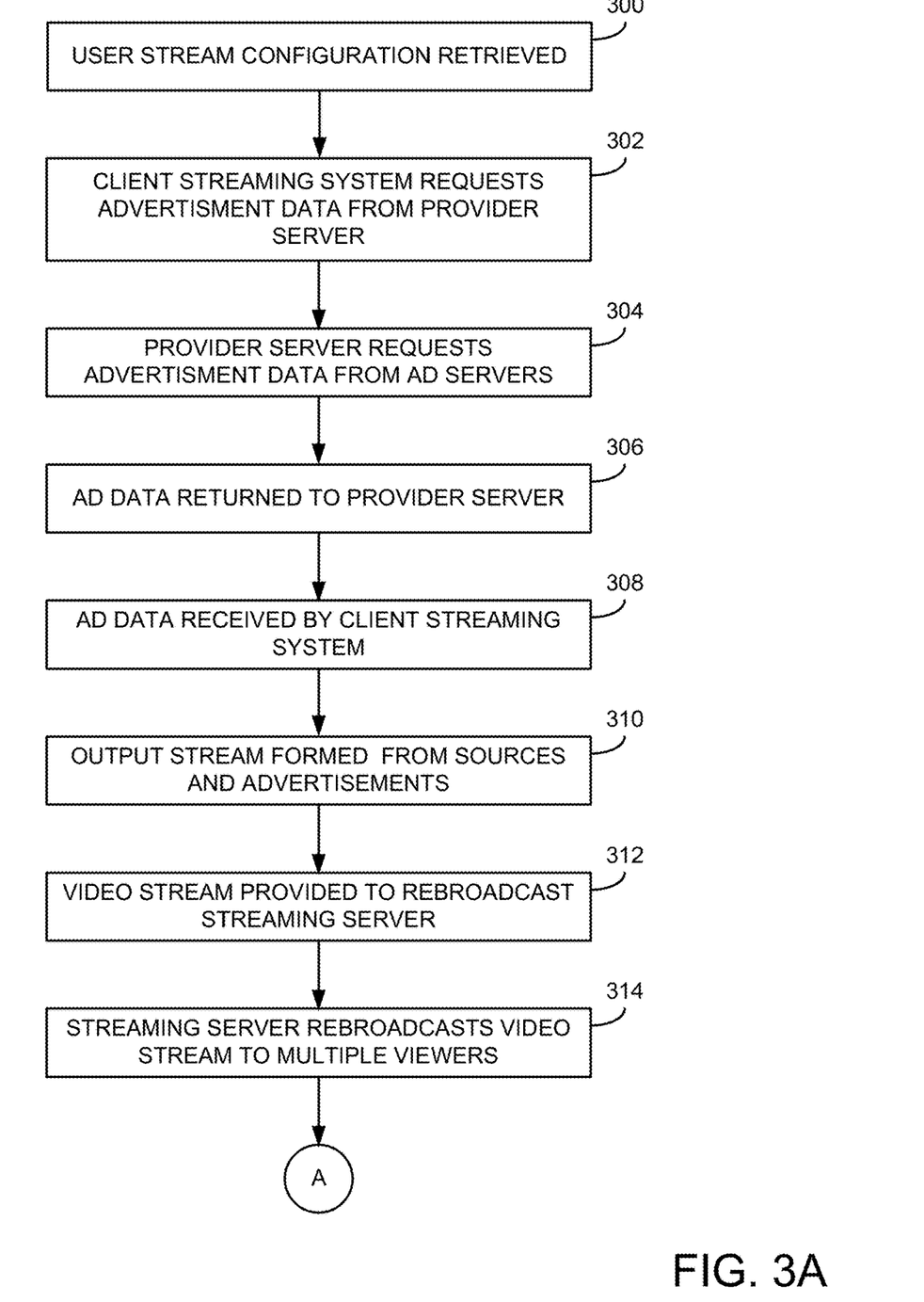
Figure 3B:
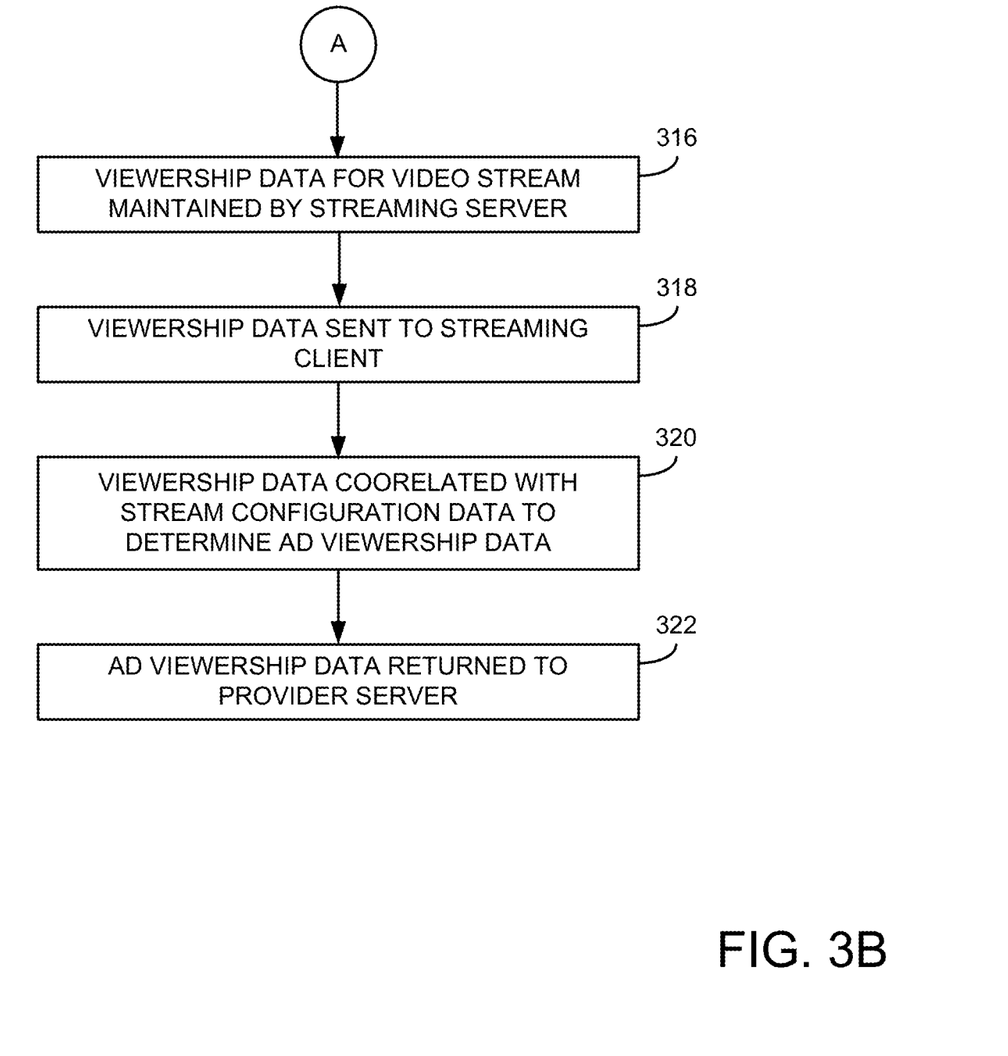

FIGS. 3A-B illustrates an overview flow diagram according to various aspects of some embodiments. More specifically, FIGS. 3A-B illustrates a process of user stream formation and distribution. For sake of convenience, the process in FIGS. 3A-B will reference elements illustrated in FIG. 1, although FIGS. 3A-B may be applied to other configurations.

Initially, as discussed in conjunction with FIG. 2, user 118 specifies their video stream, step 300. As discussed above, this may include specification of the source of content of images, video, audio, advertisements, and the like; the orientation or combinations of these content within the video stream, and the like; the duration, and the like. In the example illustrated in FIG. 1, user 118 specifies that user video of themselves playing, video 116, will be overlaid upon an upper left corner of gameplay screen 124. Additionally, user 118 specifies that two advertisements can be overlaid over gameplay screen 124, one at the upper right corner, and one at the lower left corner.

Next, based upon the user specification, client system 102 requests advertisement data from provider server 104, step 302. As illustrated, communications back and forth may be performed via Internet 112, or other wide-area network. In some embodiments, provider server 104 may contact advertisement servers, e.g. 126 and 128, for advertisement data, step 304. In the example in FIG. 1, advertisement data 130 in the form of a graphic overlay, and advertisement data 132 in the form of an image are respectively provided by ad servers 126 and 128, step 306. As discussed above, advertisement data may take many different forms. In other embodiments, advertisement data may be cached within provider server 104 ahead of time, or the like.

In various embodiments, advertisements 130 and 132 are provided to client system, step 308. In some embodiments, advertisement data may be provided a priori to client system 102, for example, advertisement data may be cached upon client system 102 when user 118 initially specifies the stream configuration, i.e. before beginning of the streaming session.

Next, based upon user 118 specification of the configuration of their video stream, the video sources, images, and the like are composited into an image, step 310, and provided to streaming server 106, step 312. In the example in FIG. 1, an example of the video stream is illustrated as video stream 134. As can be seen in that example, a video image 116 representing a webcam image overlays 138 the top left portion of the stream, an advertisement 130 representing a product logo overlays 140 the bottom left of the stream, and the like. As illustrated, client system 102 may provide streaming video to streaming server via the internet 112, or the like.

In response to video stream 134, streaming server 106 may rebroadcast that stream to viewers, step 314. For example, in FIG. 1, it can be seen that a video stream 142 is provided to a viewer 108 and a video stream 144 is provided to a viewer 110. It is contemplated that streaming server 106 may comprise many different instances so that video stream 134 can be broadcast to thousands or millions of viewers at the same time.

In various embodiments, it is contemplated that streaming server 106 records and maintains viewership data related to video stream 134, step 316. Such data may include a number of viewers of video stream 134 (e.g. maximum, average), a number of viewer-hours, and the like. This viewership data, 136, may be returned to the client system 102, step 318. In some embodiments, viewership data 136 may be broken down per time period, for example: 10K viewers in 0:00 to 0:45, 20K viewers in 0:45 to 1:30, 40K viewers in 1:30 to 3:00, or the like.

As described in FIG. 2, the configuration of the video stream, including which advertisers are displayed for which times are maintained within client system 102. Accordingly, in the next step, viewership data 136 may be correlated against which advertisers appear on video stream 134 with respect to time, screen real-estate percentage, and the like, step 320. As examples, it could be noted that advertisement 130 received 10K viewer-hours, advertisement 132 was displayed to 20K viewers, and the like. In some embodiments, other factors may include percentage of the screen covered or overlaid by advertisements, the opacity of the overlays, the percentage of sound output from the ads, whether the ads had embellishing borders, or the like.

In various embodiments, the correlated advertisement viewership data may then be provided to provider server 104, step 322. In response to such ad viewership data, advertisers (e.g. 126, 128) can pay provider server for providing the ads, such data can be used to prove that the advertisements were viewed, and the like. In some cases, advertisers (e.g. 126, 128) may prepay for such services, and have the provider server deduct from their account. Such cases may be used to allow advertisers to limit budgets for specific ads.

Figure 4:
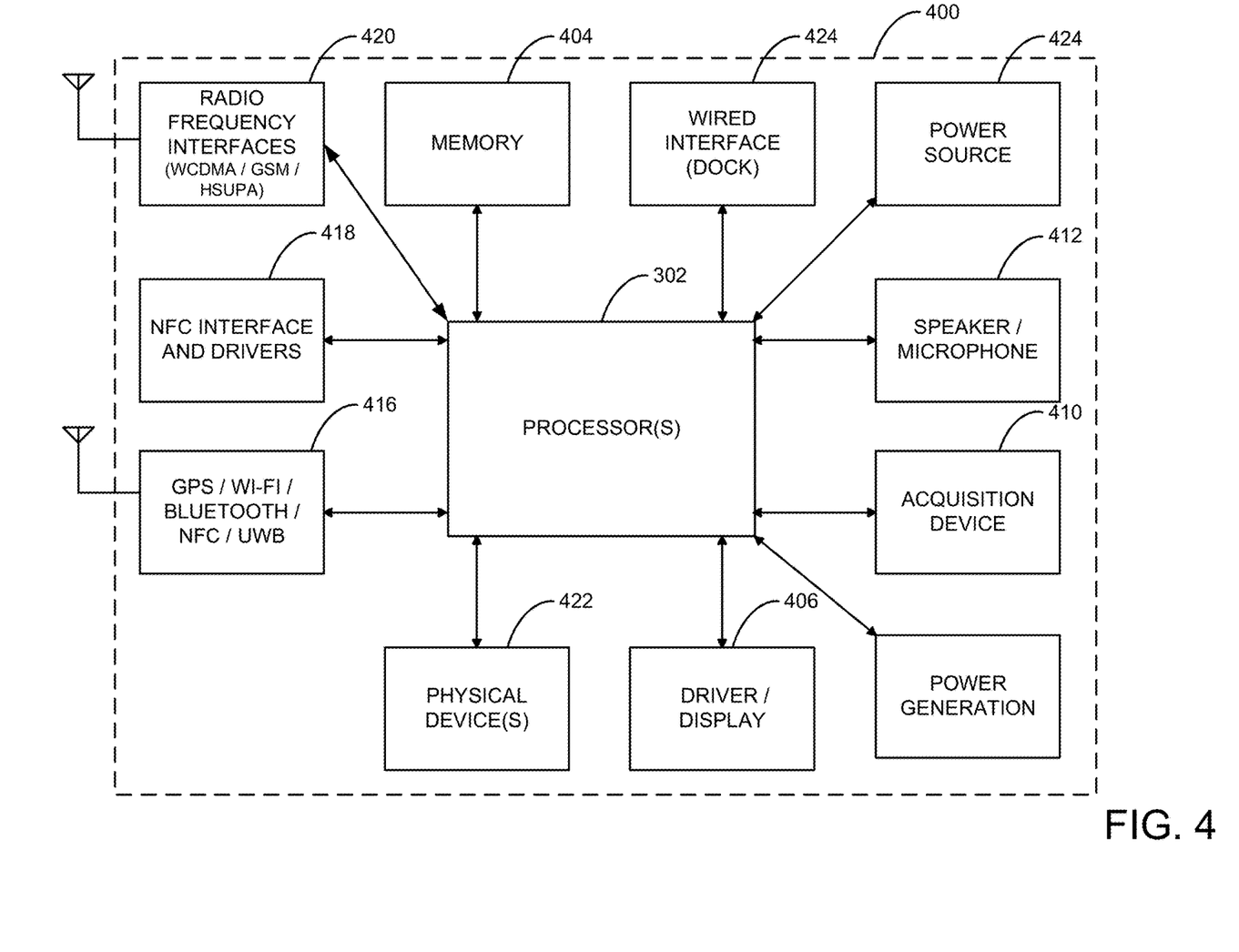
FIG. 4 illustrates another process diagram according to various embodiments of the present invention.

FIG. 4 illustrates a functional block diagram of various embodiments of the present invention. More specifically, it is contemplated that user smart devices (e.g. smart devices, smart phones, tablets), computers (e.g. servers, laptops, streaming servers, viewer systems, provider servers, advertisement servers, streaming client system, etc.), processing units, etc. may be implemented with a subset or superset of the below illustrated components.

In FIG. 4, a computing device 400 may include some, but not necessarily all of the following components: an applications processor/microprocessor 402, memory 404, a display 406, an image acquisition device 410, audio input/output devices 412, and the like. Data and communications from and to computing device 400 can be provided by via a wired interface 414 (e.g. Ethernet, dock, plug, controller interface to peripheral devices); miscellaneous rf receivers, e.g. a GPS/Wi-Fi/Bluetooth interface/UWB 416; an NFC interface (e.g. antenna or coil) and driver 418; RF interfaces and drivers 420, and the like. Also included in some embodiments are physical sensors 422 (e.g. (MEMS-based) accelerometers, gyros, magnetometers, pressure sensors, temperature sensors, bioimaging sensors etc.).

In various embodiments, computing device 400 may be a computing device (e.g. Apple iPad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin or the like); a headset or glasses (e.g. Meta Quest, HTC Vive, Sony PlaystationVR, Magic Leap, Microsoft HoloLens); a wearable device (e.g. Motiv smart ring, smart headphones); an implanted device (e.g. smart medical device), a point of service (POS) device, a server, or the like. Typically, computing device 400 may include one or more processors 402. Such processors 402 may also be termed application processors, and may include a processor core, a video/graphics core, and other cores. Processors 402 may include processors from Apple (A14 Bionic, A15 Bionic), NVidia (Tegra), Intel (Core), Qualcomm (Snapdragon), Samsung (Exynos), ARM (Cortex), MIPS technology, a microcontroller, and the like. In some embodiments, processing accelerators may also be included, e.g. an AI accelerator, Google (Tensor processing unit), a GPU, or the like. It is contemplated that other existing and/or later-developed processors/microcontrollers may be used in various embodiments of the present invention.

In various embodiments, memory 404 may include different types of memory (including memory controllers), such as flash memory (e.g. NOR, NAND), SRAM, DDR SDRAM, or the like. Memory 404 may be fixed within computing device 400 and may also include removable memory (e.g. SD, SDHC, MMC, MINI SD, MICRO SD, SIM). The above are examples of computer readable tangible media that may be used to store embodiments of the present invention, such as computer-executable software code (e.g. firmware, application programs), security applications, application data, operating system data, databases or the like. Additionally, in some embodiments, a secure device including secure memory and/or a secure processor are provided. It is contemplated that other existing and/or later-developed memory and memory technology may be used in various embodiments of the present invention.

In various embodiments, display 406 may be based upon a variety of later-developed or current display technology, including LED or OLED displays and/or status lights; touch screen technology (e.g. resistive displays, capacitive displays, optical sensor displays, electromagnetic resonance, or the like); and the like. Additionally, display 406 may include single touch or multiple-touch sensing capability. Any later-developed or conventional output display technology may be used for embodiments of the output display, such as LED IPS, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing). In some embodiments, display 406 may integrated into computing device 400 or may be separate. In some embodiments, display 406 may be in virtually any size or resolution, such as a 4K resolution display, a microdisplay, one or more individual status or communication lights, e.g. LEDs, or the like.

In some embodiments of the present invention, acquisition device 410 may include one or more sensors, drivers, lenses and the like. The sensors may be visible light, infrared, and/or UV sensitive sensors, ultrasonic sensors, or the like, that are based upon any later-developed or convention sensor technology, such as CMOS, CCD, or the like. In some embodiments of the present invention, image recognition algorithms, image processing algorithms or other software programs for operation upon processor 402, to process the acquired data. For example, such software may pair with enabled hardware to provide functionality such as: facial recognition (e.g. Face ID, head tracking, camera parameter control, or the like); fingerprint capture/analysis; blood vessel capture/analysis; iris scanning capture/analysis; otoacoustic emission (OAE) profiling and matching; and the like. In additional embodiments of the present invention, acquisition device 410 may provide user input data in the form of a selfie, biometric data, or the like.

In various embodiments, audio input/output 412 may include a microphone(s)/speakers. In various embodiments, voice processing and/or recognition software may be provided to applications processor 402 to enable the user to operate computing device 400 by stating voice commands. In various embodiments of the present invention, audio input 412 may provide user input data in the form of a spoken word or phrase, or the like, as described above. In some embodiments, audio input/output 412 may be integrated into computing device 400 or may be separate.

In various embodiments, wired interface 414 may be used to provide data or instruction transfers between computing device 400 and an external source, such as a computer, a remote server, a POS server, a local security server, a storage network, another computing device 400, an IMU, video camera, or the like. Embodiments may include any later-developed or conventional physical interface/protocol, such as: USB, micro USB, mini USB, USB-C, Firewire, Apple Lightning connector, Ethernet, POTS, custom interface or dock, or the like. In some embodiments, wired interface 414 may also provide electrical power, or the like to power source 424, or the like. In other embodiments interface 414 may utilize close physical contact of device 400 to a dock for transfer of data, magnetic power, heat energy, light energy, laser energy or the like. Additionally, software that enables communications over such networks is typically provided.

In various embodiments, a wireless interface 416 may also be provided to provide wireless data transfers between computing device 400 and external sources, such as computers, storage networks, headphones, microphones, cameras, IMUs or the like. As illustrated in FIG. 4, wireless protocols may include Wi-Fi (e.g. IEEE 802.11 a/b/g/n, WiMAX), Bluetooth, Bluetooth Low Energy (BLE) IR, near field communication (NFC), ZigBee, Ultra-Wide Band (UWB), Wi-Fi, mesh communications, and the like.

GNSS (e.g. GPS) receiving capability may also be included in various embodiments of the present invention. As illustrated in FIG. 4, GPS functionality is included as part of wireless interface 416 merely for sake of convenience, although in implementation, such functionality may be performed by circuitry that is distinct from the Wi-Fi circuitry, the Bluetooth circuitry, and the like. In various embodiments of the present invention, GPS receiving hardware may provide user input data in the form of current GPS coordinates, or the like, as described above.

Additional wireless communications may be provided via RF interfaces in various embodiments. In various embodiments, RF interfaces 420 may support any future-developed or conventional radio frequency communications protocol, such as CDMA-based protocols (e.g. WCDMA), GSM-based protocols, HSUPA-based protocols, G4, G5, or the like. In some embodiments, various functionality is provided upon a single IC package, for example the Marvel PXA330 processor, and the like. As described above, data transmissions between a smart device and the services may occur via Wi-Fi, a mesh network, 4G, 5G, or the like.

Although the functional blocks in FIG. 4 are shown as being separate, it should be understood that the various functionality may be regrouped into different physical devices. For example, some processors 402 may include Bluetooth functionality. Additionally, some functionality need not be included in some blocks, for example, GPS functionality need not be provided in a provider server.

In various embodiments, any number of future developed, current operating systems, or custom operating systems may be supported, such as iPhone OS (e.g. iOS), Google Android, Linux, Windows, MacOS, or the like. In various embodiments of the present invention, the operating system may be a multi-threaded multi-tasking operating system. Accordingly, inputs and/or outputs from and to display 406 and inputs/or outputs to physical sensors 422 may be processed in parallel processing threads. In other embodiments, such events or outputs may be processed serially, or the like. Inputs and outputs from other functional blocks may also be processed in parallel or serially, in other embodiments of the present invention, such as acquisition device 410 and physical sensors 422.

In some embodiments of the present invention, physical sensors 422 (e.g. MEMS-based) may include accelerometers, gyros, magnetometers, pressure sensors, temperature sensors, imaging sensors (e.g. blood oxygen, heartbeat, blood vessel, iris data, etc.), thermometer, otoacoustic emission (OAE) testing hardware, and the like. The data from such sensors may be used to capture data associated with device 400, and a user of device 400. Such data may include physical motion data, pressure data, orientation data, or the like. Data captured by sensors 422 may be processed by software running upon processor 402 to determine characteristics of the user, e.g. gait, gesture performance data, or the like and used for user authentication purposes. In some embodiments, sensors 422 may also include physical output data, e.g. vibrations, pressures, and the like.

In some embodiments, a power supply 424 may be implemented with a battery (e.g. LiPo), ultracapacitor, or the like, that provides operating electrical power to device 400. In various embodiments, any number of power generation techniques may be utilized to supplement or even replace power supply 424, such as solar power, liquid metal power generation, thermoelectric engines, rf harvesting (e.g. NFC) or the like.

FIG. 4 is representative of components possible for a processing device. It will be readily apparent to one of ordinary skill in the art that many other hardware and software configurations are suitable for use with the present invention. Embodiments of the present invention may include at least some but need not include all of the functional blocks illustrated in FIG. 4. For example, a smart phone (e.g. processing unit/video camera) may include some, but not all of the illustrated functionality. As additional examples, a client streaming system, may include some of the functional blocks in FIG. 4, but it need not include an accelerometer; a streaming server need not include a local video camera; a provider server need not include an internal power supply or microphone; or the like.

Many embodiments described above are described relative to gameplay videos. It should be understood that in other embodiments, other type of user activities are contemplated, such as, a user operating a graphics programs such as Photoshop, a user performing (e.g. an instrument, a dance), an artist creating art, a user in a workshop, a user driving, and the like.

In some embodiments, provider server may provide advertisements based upon a highest bidder model. For example, a user may simply allow advertisements, and provider server selects which advertisements to serve based upon which advertiser bids the most for the given streamer. For example, for a streamer with 10k viewers, if a first advertiser is willing to pay $0.10 per impression, whereas a second advertiser is willing to pay $0.08 per impression, the provider server will select the first advertisements. In some embodiments, advertisers may specify parameters for their advertisements, so advertisers on a user stream may be changed dynamically by the provider server. As examples, an advertiser may specify a campaign length (e.g. weeks, during NBA final), a maximum number of impressions (e.g. number of viewers), a maximum amount of budget, and the like. In light of the present patent disclosure, one of ordinary skill in the art will recognize that many other types of advertisement campaigns can now be implemented with embodiments of the present invention.

In some embodiments, a provider server may determine a cost effectiveness factor for the advertiser. Cost effectiveness may include any number of factors, such as the screen coverage for the advertisements in the outbound stream. For example, as was discussed above in step 210, the user may specify how the advertisements are combined into the stream. This may include the user specifying the ads take up half of the display of the outbound stream, a quarter, an eighth, or the like. The cost effectiveness may thus factor in how much of the display is covered in outbound streams, and also the duration. In some embodiments, minimum screen coverages may be specified by the advertisers such that less than ads should not be displayed on less than $\frac{1}{16}^{th}$ of the screen, payments are not to be accrued for ads that are less than $\frac{1}{10}^{th}$ of the screen, or the like. In other examples, cost effectiveness may also consider durations or lengths of time the advertisements are displayed on outbound streams. In some cases, a "standard" advertisement may cover $\frac{1}{10}^{th}$ of outbound streams, and the cost to the advertiser may be dependent upon the number of minutes it is output.

In other examples, cost effectiveness may include multiple factors. In one case, a combination of an advertisement size and a duration of display can be used to determine effectiveness. For example, a $\frac{1}{8}^{th}$ advertisement display coverage that is displayed for one hour may cost the advertiser as the same as a 1% advertisement display coverage that is displayed for 10 minutes, 15 minutes, or the like. The cost effectiveness to the advertiser for such an example may thus be the same for both configurations.

The block diagrams of the architecture and flow charts are grouped for ease of understanding. However, it should be understood that combinations of blocks, additions of new blocks, re-arrangement of blocks, and the like are contemplated in alternative embodiments of the present invention. The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A method comprises:
capturing, in a streamer device, a user video stream from a user comprising a plurality of images;
receiving, in the streamer device from the user, a specification of an incoming image characteristic associated with the plurality of images, wherein the incoming image characteristic is selected from a first group consisting of: an incoming image location within the plurality of images, and an incoming image size within the plurality of images;
receiving, in the streamer device from a remote provider server, incoming image data;
combining, in the streamer device, the user video stream and the incoming image data, to form a composite user video stream, wherein an incoming image is disposed within the plurality of images in response to the incoming image data and the incoming image characteristic;
sending, from the streamer device to a video distribution server, the composite user video stream;
receiving, in the streamer device from the video distribution server, video consumption data associated with the composite user video stream provided by the video distribution server, wherein the video consumption data comprises a number of consumers (N);
sending, from the streamer device to the remote provider server, the video consumption data associated with the composite user video stream.

2. The method of claim 1 wherein the video consumption data is also selected from a group consisting of: a median number of consumers (M), a maximum number of consumers (MAX), and a consumption time (T), N*T.

3. The method of claim 1 further comprising:
specifying, in the streamer device from the user, data provider preferences for the incoming image data; and
sending, from the streamer device to the remote provider server, an indication of the data provider preferences.

4. The method of claim 3 wherein the data provider preferences are selected from a group consisting of: preferred advertisers, preferred advertising criteria, prohibited advertisers, and prohibited advertising criteria.

5. The method of claim 1
wherein the incoming image data comprises an image; and
wherein the combining, in the streamer device, the user video stream and the incoming image data is selected from a second group consisting of: disposing the image over the plurality of images at the incoming image location, overlaying the image on top of the plurality of images in portions of the incoming image location, lightening the plurality of images in portions of the incoming image location in response to the image, and darkening the plurality of images in portions of the incoming image location in response to the image.

6. The method of claim 1 wherein the incoming image data from the remote provider server is selected from a second group consisting of: a graphic overlay, an image, a series of images, and a video.

7. The method of claim 1
wherein the first group also consists of: an incoming image shape,
wherein the incoming image shape is selected from a second group consisting of: circular, ovoid, approximately rectangular, approximately polygonal, and irregular shaped.

8. The method of claim 1 further comprising:
receiving, in the streamer device from the remote provider server, incoming audio data; and
wherein the combining, in the streamer device, the user video stream and the incoming image data, to form the composite user video stream comprises: combining, in the streamer device, the user video stream, the incoming image data, and the incoming audio data, to form the composite user video stream.

9. The method of claim 1
wherein the incoming image characteristic comprises the incoming image location within the plurality of images, and the incoming image size within the plurality of images; and
wherein the incoming image is disposed within the plurality of images in response to the incoming image location within the plurality of images and in response to the incoming image size within the plurality of images.

10. The method of claim 1 further comprising:
receiving, in the streamer device from the remote provider server, an inhibit signal; and
inhibiting combining, in the streamer device, the user video stream and the incoming image data, to form the composite user video stream, in response to the inhibit signal.

11. A non-transitory computer-readable storage medium storing one or more programs configured to be executed by one or more processors of an electronic device, the one or more programs including instructions for:
determining a video stream from a user comprising a plurality of images including a first image;
determining a specification of an incoming image characteristic, wherein the incoming image characteristic is selected from a first group consisting of: an image position from a plurality of image positions and an image size from a plurality of image sizes;
receiving, from a remote provider server, incoming image data;
forming a composite user video stream in response to the video stream, the incoming image characteristic, and the incoming image data;
outputting, to a video distribution server, the composite user video stream;
receiving, from the video distribution server, video consumption data associated with the video distribution server providing output of the composite user video stream, wherein the video consumption data comprises a number of consumers (N);
outputting, to the remote provider server, the video consumption data associated with the composite user video.

12. The non-transitory computer-readable storage medium of claim 11, the video consumption data is selected from a group consisting of: a median number of consumers (M), a maximum number of consumers (MAX), and a consumption time (T), N*T.

13. The non-transitory computer-readable storage medium of claim 11, wherein the one or more programs further include instructions for:

receiving data provider preferences from the user for the incoming image data; and outputting, to the remote provider server, an indication of the data provider preferences;

wherein the data provider preferences are selected from a second group consisting of: preferred data providers, preferred data provider criteria, prohibited data providers, and prohibited data provider criteria.

14. The non-transitory computer-readable storage medium of claim 11, wherein the video stream is selected from a second group consisting of: a video camera stream, a video of the user, a video of a point of view associated with the user, an application running on the electronic device, a game running on the electronic device, and a social network interface.

15. The non-transitory computer-readable storage medium of claim 11, wherein the incoming image data comprises an image; and wherein the one or more programs further include instructions for forming the composite user video stream by combining the video stream and the incoming image data in a manner selected from a second group consisting of: disposing the image over the plurality of images at the image location, overlaying the image on top of the plurality of images at the image position, lightening the plurality of images at the image position, and darkening the plurality of images at the image position in response to the image.

16. The non-transitory computer-readable storage medium of claim 11, wherein the incoming image data from the remote provider server is selected from a group consisting of: a graphic overlay, an image, a series of images, and a video.

17. The non-transitory computer-readable storage medium of claim 11, wherein the first group also consists of: an image shape; and wherein the incoming image shape is selected from a second group consisting of: circular, ovoid, approximately rectangular, approximately polygonal, and irregular shaped.

18. An apparatus comprises:

a video input portion, configured to provide a user video stream from a user comprising a plurality of images;

a processor coupled to the video input portion, wherein the processor is configured to receive, from the user, a specification of an incoming image location characteristic associated with the plurality of images, wherein the incoming image characteristic is selected from a first group consisting of: an incoming image location within the plurality of images, and an incoming image size within the plurality of images, wherein the processor is configured to receive, from a remote provider server, incoming image data, wherein the processor is configured to combine the user video stream and the incoming image data, to form a composite user video stream, wherein the an incoming image data is disposed in the image location within the plurality of images in response to the incoming image data and the incoming image characteristic, wherein the processor is configured to output, to a video distribution server, the composite user video stream, wherein the processor is configured to receive, from the video distribution server, video consumption data associated with the composite user video stream provided by the video distribution server, wherein the video consumption data comprises a number of consumers (N), and wherein the processor is configured to output, to the remote provider server, the video consumption data associated with the composite user video.

19. The apparatus of claim 18 wherein the incoming image data comprises an image; and wherein the processor is configure to combine the user video stream and the incoming image data in a matter selected from a second group consisting of: disposing the image over the plurality of images at the incoming image location, overlaying the image on top of the plurality of images in portions of the incoming image location, lightening the plurality of images in portions of the incoming image location in response to the image, darkening the plurality of images in portions of the incoming image location in response to the image.

20. The apparatus of claim 18 wherein the incoming image characteristic comprises the incoming image location within the plurality of images, and the incoming image size within the plurality of images; and wherein the incoming image is disposed within the plurality of images in response to the incoming image location within the plurality of images and in response to the incoming image size within the plurality of images.

* * * * *